United States Patent
Fuhry et al.

(10) Patent No.: US 11,449,624 B2
(45) Date of Patent: Sep. 20, 2022

(54) SECURE DATA PROCESSING IN UNTRUSTED ENVIRONMENTS

(71) Applicant: SAP SE, Walldorf (DE)

(72) Inventors: Benny Fuhry, Karlsruhe (DE); Jonas Boehler, Karlsruhe (DE)

(73) Assignee: SAP SE, Walldorf (DE)

( * ) Notice: Subject to any disclaimer, the term of this patent is extended or adjusted under 35 U.S.C. 154(b) by 218 days.

(21) Appl. No.: 16/787,787

(22) Filed: Feb. 11, 2020

(65) Prior Publication Data

US 2021/0248253 A1 Aug. 12, 2021

(51) Int. Cl.
G06F 21/62 (2013.01)
G06F 21/71 (2013.01)
H04L 9/40 (2022.01)
G06F 21/82 (2013.01)

(52) U.S. Cl.
CPC ...... *G06F 21/6218* (2013.01); *H04L 63/0428* (2013.01); *H04L 63/0876* (2013.01)

(58) Field of Classification Search
None
See application file for complete search history.

(56) References Cited

U.S. PATENT DOCUMENTS

| 2018/0137299 A1 | 5/2018 | Porter et al. |
| 2018/0211034 A1 | 7/2018 | Costa |
| 2018/0241572 A1* | 8/2018 | Miele ............... H04L 9/0643 |
| 2019/0147188 A1 | 5/2019 | Benaloh et al. |
| 2019/0180006 A1 | 6/2019 | Bojjireddy et al. |
| 2019/0222574 A1* | 7/2019 | Akbar ............... H04L 63/061 |
| 2020/0089917 A1* | 3/2020 | Skourtis ............ H04L 9/008 |
| 2021/0035249 A1* | 2/2021 | Kohari .............. G06Q 50/265 |
| 2022/0067150 A1* | 3/2022 | Karame ............. G06F 21/53 |

OTHER PUBLICATIONS

CN 109361668A. English Translation. (Year: 2019).*
Implications of Privacy Preserving K-Means Clustering Over Outsourced Data on Cloud Platform. Anurag. (Year: 2018).*
UML Based Model for Displaying Privacy Preserving Data Mining Systems. Anurag. (Year: 2018).*
Privacy Preserving Data Publishing with Multiple Sensitive Attributes based on Overlapped Slicing. Widodo. (Year: 2019).*
An Approach for Distributing Sensitive Values in k-Anonymity. Widodo. IEEE. (Year: 2019).*
CN113742766. English Translation. (Year: 2020).*

(Continued)

*Primary Examiner* — Venkat Perungavoor
(74) *Attorney, Agent, or Firm* — Mintz Levin Cohn Ferris Glovsky and Popeo, P.C.

(57) ABSTRACT

Aspects of the current subject matter are directed to performing privacy-preserving analytics over sensitive data without sharing plaintext data and without requiring a trusted third party. Implementations provide for utilizing a trusted execution environment within a server to compute the privacy-preserving result. Data owners via user devices send their encrypted data directly to an enclave managed by a trusted execution environment, without the server and the cloud service provider for the server seeing the plaintext data. The enclave computes the analytics directly on the data and releases the privacy-preserving result that can be ensured by code analysis and remote attestation from all parties.

21 Claims, 6 Drawing Sheets

(56) References Cited

OTHER PUBLICATIONS

A First Step Towards Leveraging Commodity Trusted Execution Environments for Network Applications. Kim. ACM. (Year: 2018).*
Hermetic: Privacy-preserving distributed analytics without (most) side channels. Xu. (Year: 2019).*
Boehler, Jonas et al., "Privacy-Preserving Outlier Detection for Data Streams", Jun. 22, 2017 (Jun. 22, 2017), ICIAP: International Conference On Image Analysis And Processing, 17th International Conference, Naples, Italy, Sep. 9-13, 2013. Proceedings; [Lecture Notes In Computer Science; Lect.Notes Computer], Springer, Berlin, Heidelberg, pp. 225-2, XP047420085.
European Search Report issued in EP 20203188.6, dated Apr. 12, 2021.
WWDC 2016. "Engineering privacy for your users", 2016.
Anati, Ittai et al., "Innovative Technology for CPU Based Attestation and Sealing." In Workshop on Hardware and Architectural Support for Security and Privacy (HASP), 2013.
Bittau, Andrea et al., "Prochlo: Strong privacy for analytics in the crowd." In Proceedings of the 26th Symposium on Operating Systems Principles. ACM, 2017.
Costan, Victor et al., "Intel SGX Explained. Technical Report." IACR Cryptology ePrint Archive, 2016.
Cheu, Albert et al., "Distributed differential privacy via shuffling." In Annual International Conference on the Theory and Applications of Cryptographic Techniques, pp. 375-403. Springer, 2019.
Dwork, Cynthia et al., "Our data, ourselves: Privacy via distributed noise generation." In Annual International Conference on the Theory and Applications of Cryptographic Techniques, 2006.
Dwork, Cynthia et al., "Calibrating noise to sensitivity in private data analysis." In Theory of Cryptography Conference, 2006.
Dwork, Cynthia, "Differential privacy." In International Colloquium on Automata, Languages, and Programming, 2006.
Ding, Bolin et al., "Collecting telemetry data privately." In Advances in Neural Information Processing Systems, 2017.
Erlingsson, Ulfar et al., "Rappor: Randomized aggregatable privacy-preserving ordinal response." In Proceedings of the annual ACM conference on computer and communications security, 2014.
Goldreich, Oded, "Foundations of Cryptography," vol. 2, Basic Applications. 2009.
Hsu, Justin et al., "Distributed private heavy hitters." In International Colloquium on Automata, Languages, and Programming, 2012.
Hoekstra, Matthew et al., "Using Innovative Instructions to Create Trustworthy Software Solutions." In Workshop on Hardware and Architectural Support for Security and Privacy (HASP), 2013.
Intel, "Intel Software Guard Extensions Programming Reference." hftps://software.intel.com/sites/default/files/managed/48/88/329298-002.pff, 2014.
Intel Corporation, "Intel® Software Guard Extensions (Intel® SGX)." https://software.intel.com/sites/default/files/332680-002.pdf, 2015.
Kasiviswanathan, Shiva Prasad et al., "What can we learn privately?" SIAM Journal on Computing, 2011.
Li, Ninghui et al., "t-closeness: Privacy beyond k-anonymity and l-diversity." In Data Engineering, 2007. ICDE 2007. IEEE 23rd International Conference on, pp. 106-115. IEEE, 2007.
McKeen, Frank et al., "Innovative Instructions and Software Model for Isolated Execution." In Workshop on Hardware and Architectural Support for Security and Privacy (HASP), 2013.
Machanavajjhala, Ashwin et al., "I-diversity: Privacy beyond k-anonymity." In 22nd International Conference on Data Engineering (ICDE'06), pp. 24-24. IEEE, 2006.
McGregor, Andrew et al., "The limits of two-party differential privacy." In Annual IEEE Symposium on Foundations of Computer Science, 2010.
Sweeney, Latanya, "k-anonymity: A model for protecting privacy." International Journal of Uncertainty, Fuzziness and Knowledge-Based Systems, 10(05):557-570, 2002.
Apple's Differential Privacy Team. Learning with privacy at scale, 2017.

* cited by examiner

SECURE DATA PROCESSING IN UNTRUSTED ENVIRONMENTS

FIELD

The present disclosure generally relates to secure data processing and, more specifically, to privacy-preserving analytics over sensitive data.

BACKGROUND

Services for performing analytics (e.g., statistics, aggregate queries, or the like) on sensitive data may involve sharing data with a third party. In some instances, it may not be desirable or feasible for one or more parties sharing data to share plaintext data. For example, the data may be sensitive data that is not permitted to be shared. In some instances, the parties sharing the data may be mutually distrusting parties. In other instances, use of a trusted third-party may not be feasible as the trusted third-party may become compromised.

SUMMARY

Methods, systems, and articles of manufacture, including computer program products, are provided for privacy-preserving analytics over sensitive data.

According to an aspect, a system includes at least one data processor and at least one memory storing instructions which, when executed by the at least one data processor, result in operations including: receiving, from at least one input device, at least one data processing preference of the at least one input device, verification data of the at least one input device, and verification data of an output device; creating a trusted application including an isolated, trusted environment configured to implement data processing defined by the at least one data processing preference, where the creating includes linking the isolated, trusted environment with the verification data of the at least one input device and the verification data of the output device; providing, to the at least one input device, trust data associated with the isolated, trusted environment; and providing, to an application provider, the trusted application including the isolated, trusted environment to implement the data processing defined by the at least one data processing preference. The data processing may be implemented in response to mutual verification between the isolated, trusted environment and the at least one input device, where the mutual verification is based on the trust data of the isolated, trusted environment and the verification data of the at least one input device.

In some variations, one or more of the features disclosed herein including the following features can optionally be included in any feasible combination. The at least one data processing preference may include an analysis method and/ or a data transfer policy. The verification data of the at least one input device may include a verification key of the at least one input device, and the verification data of the output device may include a verification key of the output device. The receipt of the at least one data processing preference and the verification data may be through an application offered by the system. The at least one data processing preference of the at least one input device may be agreed upon by a plurality of input parties. The verification data of the output device may be provided by the at least one input device. The verification data of the at least one input device and the verification data of the output device may be hardcoded into the enclave. The trust data associated with the isolated, trusted environment may include one or more of a measurement of the isolated, trusted environment and source code of the isolated, trusted environment.

According to an aspect, a system includes at least one data processor and at least one memory storing instructions which, when executed by the at least one data processor, result in operations including: establishing, by an enclave that is part of a trusted application running at an application provider and that is configured to perform data processing defined by at least one predefined data processing preference, a first trusted relationship with an input device, where the establishment is based on trust data associated with the enclave and verification data associated with the input device; receiving, by the enclave and from the input device over a first authenticated channel, data to be processed in accordance with the at least one predefined data processing preference; establishing, by the enclave, a second trusted relationship with an output device, where the establishment is based on the trust data associated with the enclave and verification data associated with the output device; and providing, by the enclave and to the output device over a second authenticated channel, results of the data processed in accordance with the at least one predefined data processing preference.

According to an inter-related aspect a computer-implemented method may include establishing, by an enclave that is part of a trusted application running at an application provider and that is configured to perform data processing defined by at least one predefined data processing preference, a first trusted relationship with an input device, where the establishment is based on trust data associated with the enclave and verification data associated with the input device; receiving, by the enclave and from the input device over a first authenticated channel, data to be processed in accordance with the at least one predefined data processing preference; establishing, by the enclave, a second trusted relationship with an output device, where the establishment is based on the trust data associated with the enclave and verification data associated with the output device; and providing, by the enclave and to the output device over a second authenticated channel, results of the data processed in accordance with the at least one predefined data processing preference.

In some variations, one or more of the features disclosed herein including the following features can optionally be included in any feasible combination. Establishing the first trusted relationship with the input device may include: providing, by the enclave and to the input device, trust data associated with the enclave; and authenticating, by the enclave, the input device as an authorized user of the enclave. The trust data associated with the enclave may include one or more of a measurement of the enclave and source code of the enclave, and the enclave may be a trusted entity based on the trust data matching setup trust data previously provided by a separate entity to the input device. The authentication of the input device may include: generating and sending to the input device a random code; receiving, from the input device, a message including a signed code and a verification key; and verifying one or more of the signed code including the random code, the signed code verifiable with the verification key, and the verification key matching a setup verification key previously associated with the enclave. The at least one predefined data processing preference may include an analysis method and/ or a data transfer policy. Further operations may include tagging the data with verification data associated with the input device; and handling the tagged data in according with the data transfer policy and based on the verification data associated with the input device. The provision of the results of the data processed to the output device may be based on a function requested by the output device, the function in accordance with the analysis method defined in the at least one predefined data processing preference. Establishing the second trusted relationship with the output device may include: providing, by the enclave and to the output device, trust data associated with the enclave; and authenticating, by the enclave, the output device as an authorized user of the enclave. The trust data associated with the enclave may include one or more of a measurement of the enclave and source code of the enclave, and the enclave may be a trusted entity based on the trust data matching setup trust data previously provided by a separate entity to the output device. The authentication of the output device may include: generating and sending to the output device a random code; receiving, from the output device, a message including a signed code and a verification key; and verifying one or more of the signed code including the random code, the signed code verifiable with the verification key, and the verification key matching a setup verification key previously associated with the enclave. The first authenticated channel may be established by the enclave during establishment of the first trusted relationship and/or the second authenticated channel may be established by the enclave during establishment of the second trusted relationship.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Like labels are used to refer to same or similar items in the drawings.

DETAILED DESCRIPTION

Aspects of the current subject matter are directed to performing privacy-preserving analytics (e.g., statistics, aggregate queries, or the like) over sensitive data without sharing plaintext data and without requiring a trusted third party. The analysis may be performed over data of one party or over aggregated data from multiple parties.

In particular, implementations of the current subject matter provide for utilizing a trusted execution environment (TEE) within a server to compute a privacy-preserving result of data. According to some aspects, differentially private mechanisms may be utilized to compute the privacy-preserving result, although implementations are not so limited and other mechanisms may be used to compute the privacy-preserving result. Data owners send their encrypted data directly to an enclave managed by a trusted execution environment, without the server and the cloud service provider for the server seeing the plaintext data, unlike with a trusted third party. The enclave computes the analytics directly on the data and releases a privacy-preserving result that can be ensured by code analysis and remote attestation from all parties. Additional details are provided herein.

The trusted execution environment allows one or multiple parties to transfer their data to an untrusted service provider in a secure fashion, the service performs an analysis on the data (which may be aggregated from various parties) without having access to plaintext data, and one or multiple parties receive an anonymized result. According to aspects of the current subject matter, input parties (e.g., user equipment) first check the service's trustworthiness; then, the input parties transfer their sensitive data to the service in a protected manner; the service performs a specified, protected, highly accurate analysis on the data without having access to plaintext data; and the service provides anonymized results to output parties (e.g., user equipment).

Consistent with implementations of the current subject matter, involved parties may agree on the data analysis before data is transferred to the service. The data analysis may include multiple low-level operations or high-level analysis tasks, and the service guarantees that no other analysis is performed. The input parties and output parties may be the same, may overlap, or may be completely independent.

The system consistent with implementations of the current subject matter uses a trusted execution environment (TEE) for the trustworthiness check, to receive the data, to perform the analysis, and to return the anonymized results. Trusted execution environments provide an isolated, trusted environment for application code and data, known as an enclave, even in untrusted environments. In some instances, the trusted execution environment may be an Intel® Software Guard Extensions (SGX) environment, although implementations of the current subject matter are not so limited and other trusted execution environments that provide the required capabilities (such as integrity and confidentiality protection of code and data, remote attestation, and secure data provisioning) may be used.

The privacy of the results may be protected by anonymization techniques, such as k-means, l-diversity, t-closeness, or various other anonymization techniques. According to aspects of the current subject matter, differential privacy may be used. Differential privacy may provide a rigorous, formal privacy guarantee that bounds the attacker's information gain and hinders linkage attacks.

Combining a trusted execution environment with differential privacy, the service consistent with implementations of the current subject matter does not reveal any private data during transfer, processing, or in the result. The service according to aspects disclosed herein may present a solution for the following two scenarios. As a first example, a party wishes to perform data analysis on the party's own data. After data transfer to the service, no involved party can have access to the plaintext data and the analysis results have to be anonymized. This setting is useful, for instance, if privacy regulating laws otherwise forbid analysis on the data. For example, with this first scenario, a company may perform analysis over its own data to which privacy restrictions apply (e.g., medical data, human resources data, confidential employee or customer data, etc.) without violating the privacy of employees or customers. By performing the analysis, issues or trends may be identified and/or optimization techniques may be employed, depending on the data type and the particular analysis being done.

As another example, suppose multiple parties wish to perform data analysis on the aggregate of their data. When a party transfers data to the service, no other party is allowed access to the plaintext data. After data transfer to the service, no party involved in the analysis can have access to the plaintext data, and the analysis results have to be anonymized. This setting is useful, for instance, if the parties do not trust each other or any third party with their sensitive data. For example, with this second scenario, a company can offer the service with the trusted execution environment to other companies for performing aggregated analytics. Alternatively, a company can use the service with the trusted execution environment to perform analysis over data stored in a cloud offerings. The analysis may be performed across multiple companies. For example, data from related companies may be combined to obtain valuable insights that are not otherwise possible.

Figure 1:
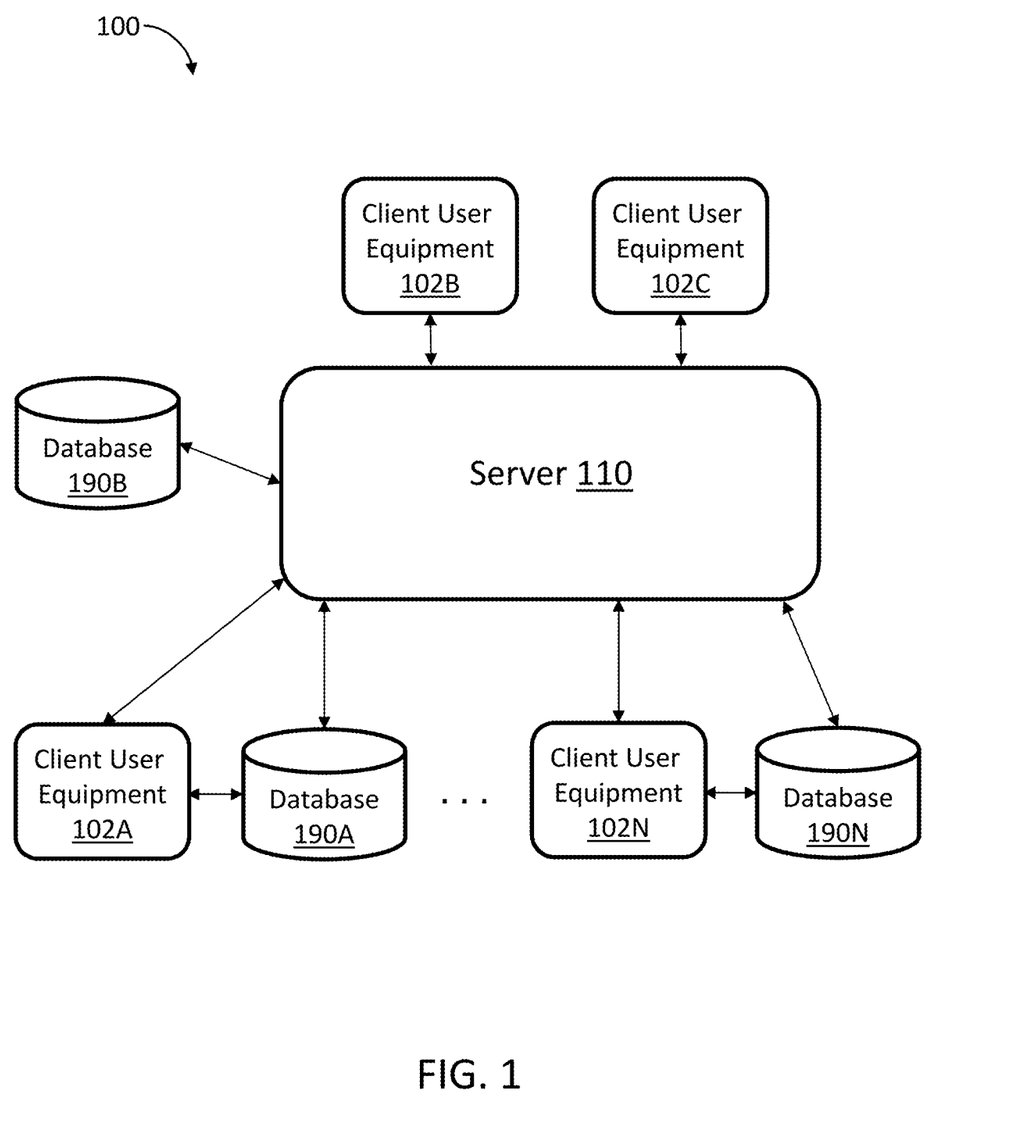
FIG. 1 is a block diagram illustrating a system architecture in which implementations of the current subject matter may be employed.

FIG. 1 depicts an example of a system 100 in which implementations of the current subject matter may be employed.

The system 100 may include one or more client user equipment 102A-N, such as a computer, a smart phone, a tablet, an Internet of Things (IoT) device, and/or other devices (e.g., processor and memory-based devices). The user equipment 102A-N may include a user interface, such as a browser or other application to enable access to one or more applications, database layer(s), and/or databases 190A-N.

The server 110 may receive queries, requests, and/or commands from the user equipment 102A-N. The communication between the user equipment 102A-N and the server 110 may be via a connection, such as a wired and/or wireless connection (e.g., the Internet, cellular links, WiFi links, and/or the like). The server 110 may access data from the databases 190A-N, which may be associated with one or more of the user equipment 102A-N.

The server 110 is one example of an engine (e.g., a cloud server or cloud provider or cloud service provider) that may be utilized for the privacy-preserving analytics consistent with implementations of the current subject matter.

The trusted execution environment, according to aspects of the current subject matter, provides an enclave, which is an isolated, trusted environment for application code and data. The enclave may guarantee confidentiality and integrity protection to code and data in it, even in an untrusted environment, such as the server 110. Consistent with implementations of the current subject matter, the trusted execution environment may dedicate at least a portion of the system's main memory (e.g., RAM) for processor reserved memory (PRM). All code and data in the processor reserved memory may be encrypted while residing outside of the central processing unit, and decrypted and integrity checked when the data is loaded into the central processing unit. All other software on the system, including privileged software such as the operating system, hypervisor, and firmware, cannot access the processor reserved memory. The operating system may swap out enclave pages, and the trusted execution environment ensures integrity, confidentiality, and freshness of swapped-out pages. According to aspects of the current subject matter, programs using the trusted execution environment may also include an untrusted part. The untrusted part may be executed as an ordinary process, and the enclave memory may be mapped into the virtual memory of the untrusted host process. This mapping allows the enclave to access the entire virtual memory of its host process, while the host process can invoke the enclave only through a well-defined interface. Input and output may be transferred through the untrusted part to and/or from the enclave.

The trusted execution environment may have a remote attestation feature, allowing for verification of code integrity and authenticity on a remote system. This is done by hashing (also referred to as measuring) the initial code and data loaded into the trusted execution environment. A signed version of the measurement may be provided to an external party to prove the correct creation of an enclave. Furthermore, the remote attestation feature allows to establish a secure channel between an external party and an enclave. This secure channel may be used to deploy sensitive data, e.g., cryptographic keys, directly into the enclave.

Consistent with implementations of the current subject matter, a digital signature scheme may be an asymmetric cryptosystem where a sender signs a message with a (secret) signature key (SK) to create a digital signature. A receiver may verify the digital signature with a (public) verification key (VK) to ensure authenticity (e.g., that the message was sent from the sender).

Differential privacy, consistent with implementations of the current subject matter, may be used when statistical properties of a data set can be learned but information about any individual in the data set is to be protected. Databases D, D' are called neighbors or neighboring, denoted with D≅D', when they differ in one element. A differentially private algorithm may limit the impact that the presence or absence of any individual's data in the input database can have on the distribution of outputs. The formal definition may be as follows and as defined in equation 1 below: A mechanism $\mathcal{R}$ satisfies $\in$-differential privacy, where $\in \geq 0$, if for all neighboring databases D and D', and all sets $\mathcal{S} \subsetneq \text{Range}(\mathcal{R})$:

$$Pr[\mathcal{R}(D) \in \mathcal{S}] \leq \exp(\in) \cdot Pr[\mathcal{R}(D') \in \mathcal{S}] \qquad (1),$$

where Range($\mathcal{R}$) denotes the set of all possible outputs of mechanism $\mathcal{R}$.

Aspects of the current subject matter are directed to a protected central model for differential privacy (or other anonymization techniques). Consistent with implementations of the current subject matter, the service may be offered as software-as-a-service by a cloud provider (e.g., the server 110 in FIG. 1). One or multiple input parties (e.g., accessing the user equipment 102A-N) may want to provide data to the service, one or multiple output parties may want to receive the anonymized results, and all input parties and output parties may access the service via the Internet. The service consistent with implementations of the current subject matter may be adjusted to other usage models, e.g., platform-as-a-service or an offline application.

Figure 2:
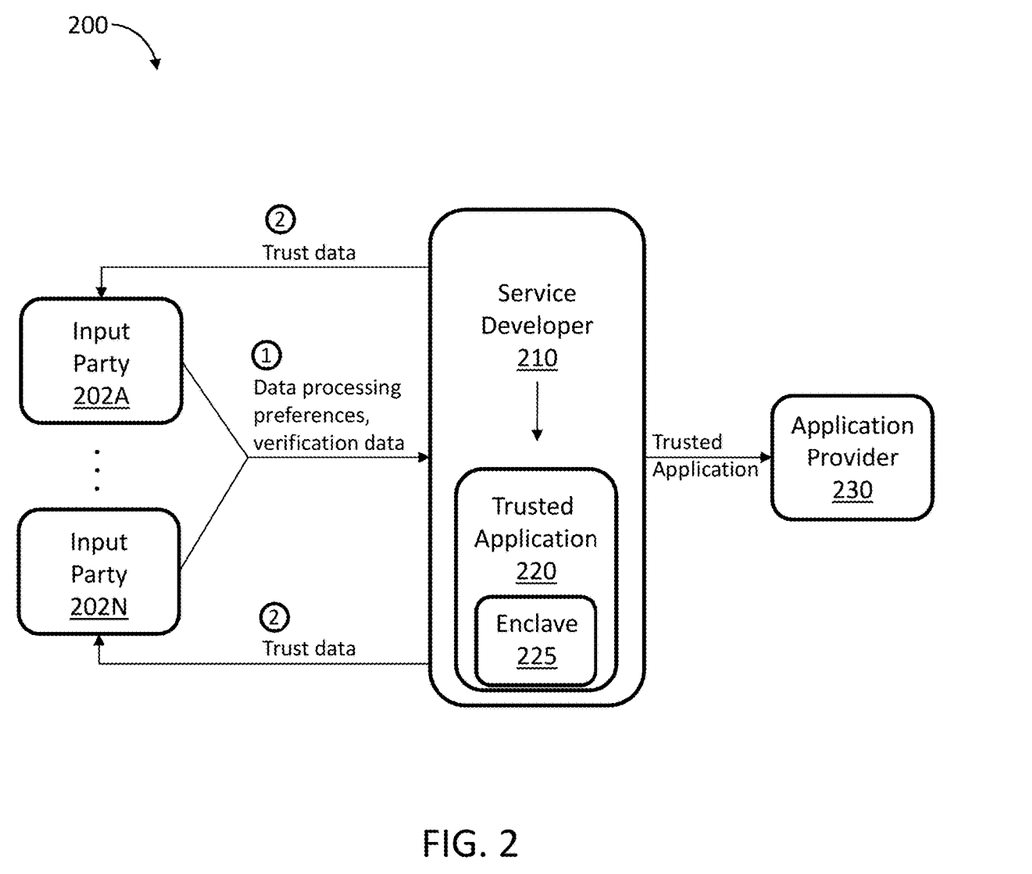
FIG. 2 is a block diagram illustrating features of a setup phase of a service consistent with implementations of the current subject matter.

With reference to FIG. 2, block diagram 200 illustrates features of a setup phase of a service that incorporates a trusted application having an enclave, consistent with implementations of the current subject matter.

Input parties 202A-N (which may include user equipment) that want to use the service agree on an analysis $\mathcal{A}$ that should be performed by the service hosted at an application provider 230 (e.g., a cloud provider). $\mathcal{A}$ can be one or multiple algorithms $\mathcal{R}_F$, which produce a differentially private version of function $\mathcal{R}$ on plaintext data. The input parties 202A-N may also agree on a data transfer policy. Transfer policies may state, for example, that data may be transferred only once, data may be added later, or data may be removed later. The input parties 202A-N may also agree on a set of output parties (which may include user equipment) that are able to receive the anonymized output of the service. Consistent with implementations of the current subject matter, there is no strict connection between the input parties and the output parties (e.g., each input party may be an output party, some input parties may be an output party, and/or the input parties and the output parties are completely independent).

The service developer 210 receives analysis $\mathcal{A}$, the transfer policy $\mathcal{TP}$, the verification key of each input party (set $VK_{IPs}$) and the verification key of each output party (set $VK_{OPs}$). This information may be transferred in a variety of ways. For example, the service developer 210 may offer an online service to help or assist the input parties with this process. In some implementations, the service developer 210 may be a cloud provider, but implementations of the current subject matter are not so limited and the service developer 210 may be separate from the cloud provider (e.g., the server 110).

The service developer 210 creates a trusted application 220 including an enclave 225 that is able to perform $\mathcal{A}$ and the necessary steps of the data provisioning and the analysis phase. Furthermore, the sets of verification keys, $VK_{IPs}$ and $VK_{OPs}$, may be hard-coded into the enclave 225. If the input parties 202A-N trust the service developer 210, it may be enough if the input parties 202A-N receive only the measurement of the enclave 225 from the service developer 210. Otherwise, in some implementations, it may be necessary to also share the source code of the enclave 225, because the input parties 202A-N have to be sure that the verification keys are hard-coded. Finally, the enclave 225 is provided to the input parties 202A-N, which employ it on an application provider 230 (e.g., a cloud provider) supporting the trusted execution environment.

Figure 3:
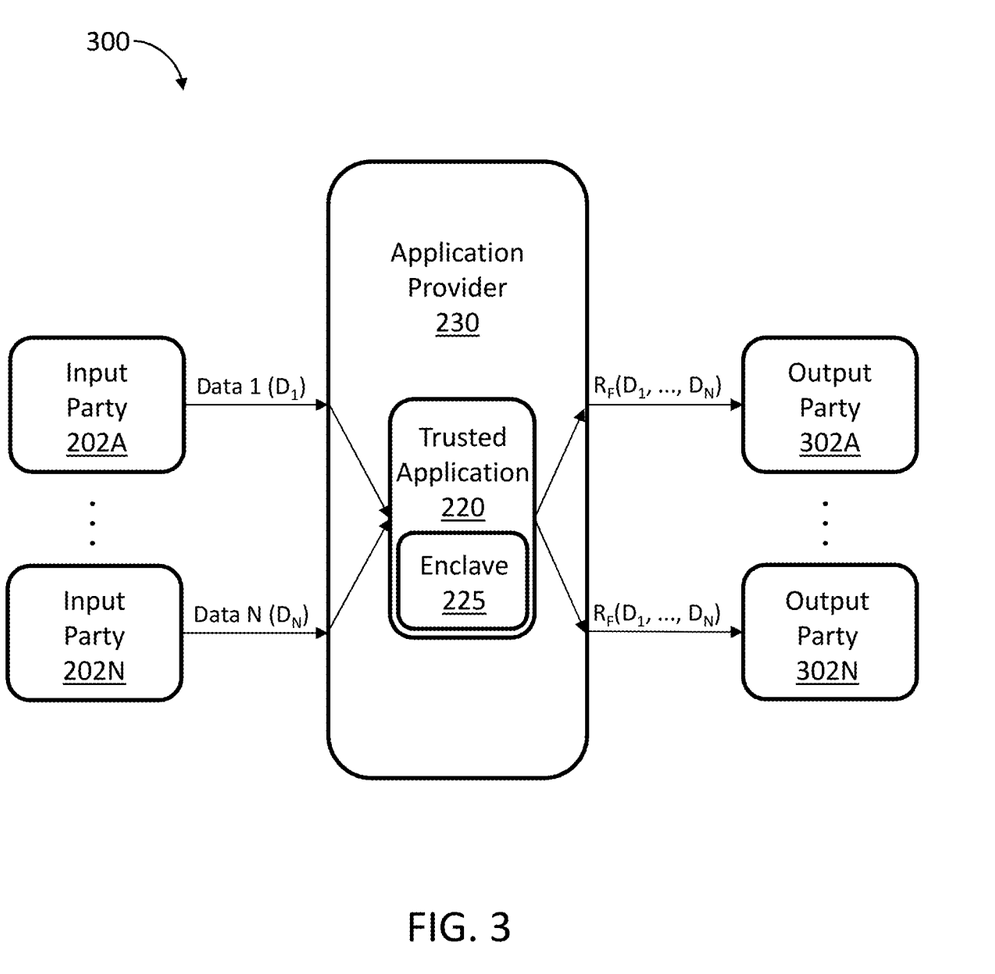
FIG. 3 is a block diagram illustrating features of data provisioning and analysis phases of a service consistent with implementations of the current subject matter.

With reference to FIG. 3, block diagram 300 illustrates features of data provisioning and analysis phases of a service consistent with implementations of the current subject matter.

The data provisioning phase consistent with implementations of the current subject matter may have the following steps for each input party 202A-N. An input party 202A-N may connect to the application provider 230 and perform remote attestation with the enclave 225. If the measurement received during remote attestation matches the expected measurement, the input party 202A-N may be sure that it talks to the correct enclave 225. The input party 202A-N may also be sure that its verification key is part of the enclave 225, as it was hard-coded and as such becomes part of the enclave measurement.

According to aspects of the current subject matter, an authenticated channel (e.g., a channel protecting confidentiality and integrity of all messages) may be established between the input party 202A-N and the enclave 225 during remote attestation. All subsequent messages may be transferred through this channel. For example, the enclave 225 may generate a random nonce and send a message with it to the input party 202A-N. The input party 202A-N may sign the nonce with its signature key corresponding to the verification key that is hard-coded into the enclave 225. Then the input party 202A-N may create a message containing the signed nonce and its verification key and send it back to the enclave 225.

The enclave 225 checks if the received verification key is one of the hard-coded keys $VK_{IPs}$, if the nonce is equal to the one that was sent before, and/or if the signature may be verified with the sent verification key. Consistent with implementations of the current subject matter, if one or more checks fail, the enclave 225 may abort the connection. Otherwise, the enclave 225 may be sure that it talks to an authentic party and sends a success message to the input party 202A-N.

Following the verification of the input party 202A-N by the enclave 225, the input party 202A-N may send its sensitive data, which should be included in analysis $\mathcal{A}$.

Consistent with implementations of the current subject matter, the enclave 225 may tag all received data from the input party 202A-N with the used verification key. Consistent with implementations of the current subject matter, the enclave 225 may wait until it receives data from some (if not all) input parties 202A-N, before it enables the subsequent analysis phase. Based on the agreed transfer policy, each input party 202A-N may repeat the data provisioning to upload or delete data at any time. The data tagging is, consistent with implementations of the current subject matter, used to enforce that an input party 202A-N may only delete its own data.

Following the data provisioning phase, and with continued reference to FIG. 3, an analysis phase may follow. Consistent with implementations of the current subject matter, during the analysis phase, each output party 302A-N (which may include user equipment) may perform similar steps as that of the input parties 202A-N to verify the enclave 225. Consistent with implementations of the current subject matter, the enclave 225 may check to determine if it received a verification key contained in $VK_{OPs}$. After successful mutual authentication, the output parties 302A-N may request the result of one $\mathcal{R}_F$ which is part of $\mathcal{A}$. The enclave 225 checks if $\mathcal{R}_F$ is a valid function defined in $\mathcal{A}$. If this is not the case, the enclave 225 may return an error, send a list of possible $\mathcal{R}_F$, or abort the connection. Otherwise, the enclave 225 may perform $\mathcal{R}_F$ and returns the anonymized result.

Figure 4:
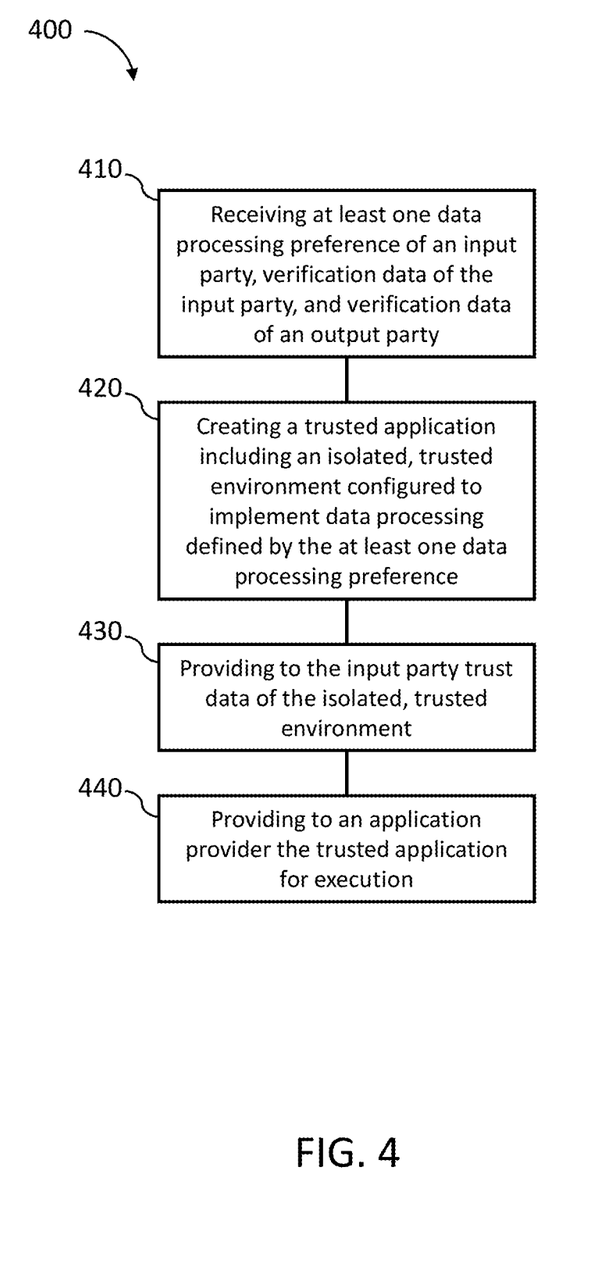
FIG. 4 depicts a flowchart illustrating a process consistent with implementations of the current subject matter.

FIG. 4 depicts a flowchart 400 illustrating a process consistent with implementations of the current subject matter.

At 410, the service developer 210 receives from an input party 202A at least one data processing preference of the input party 202A. For example, the input party 202A may send to the service developer 210 information related to an analysis method and/or a data transfer policy. The analysis method may be an analysis $\mathcal{A}$ that the input party 202A wants to be performed by a service hosted at the service developer 210 (e.g., a cloud provider). For example, $\mathcal{A}$ may be one or multiple algorithms $\mathcal{R}_F$, which produce a differentially private version of function $\mathcal{R}$ on plaintext data. The data transfer policy may indicate transfer policies that define how the data should be transferred and handled. At 410, the service developer 210 also receives from the input party 202A verification data of the input party 202A and verification data of an output party 302A. For example, the input party 202A may decide that the output party 302A is to receive the anonymized output of the service. As such, verification data associated with the input party 202A and verification data associated with the output party 302A may be provided. The verification data of the input party 202A may include, for example, a verification key of the input party 202A, and the verification data of the output party 302A may include a verification key of the output party 302A.

According to aspects of the current subject matter, the receipt of the at least one data processing preference and the verification data may be through an application offered by the system (e.g., the service developer 210 or a cloud provider). The application offered by the system may provide a user interface or other mechanism for the input party 202A to specify the data processing preferences and the verification data of both the input party 202A and the output party 302A.

At 420, the service developer 210 creates a trusted application 220 with an enclave 225 (e.g., an isolated, trusted environment), where the enclave 225 is configured to implement data processing defined by the at least one data processing preference. For example, as the data processing preference may include an analysis method and/or a data transfer policy, as indicated or established by the input party 202A, the enclave 225 may be configured to implement the analysis method and/or transfer data as defined by the data transfer policy. Moreover, the verification data (e.g., that of the input party 202A and that of the output party 302A) may be associated with the enclave 225. The association of the verification data with the enclave 225 may serve to link the particular input party 202A and the particular output party 302A with the enclave 225. For example, the verification data associated with the input party 202A and the verification data associated with the output party 302A may be hardcoded into the enclave 225.

According to aspects of the current subject matter, the at least one data processing preference may be agreed upon by a plurality of input parties 202A-N. For example, two or more input parties 202A-N may agree on the data processing preferences such that the enclave 225 is created in such a way that it is configured to implement the analysis method and/or transfer data as defined by the data transfer policy that is mutually agreeable to the two or more input parties 202A-N.

At 430, the service developer 210 provides, to the input party 202A, trust data associated with the enclave 225. For example, after the service developer 210 creates the enclave 225 based on the data provided by the input party 202A, the service developer 210 may then provide the trust data of the enclave 225 such that the input party 202A may later use the trust data to verify the authenticity of the enclave 225 as described herein. According to aspects of the current subject matter, the trust data of the enclave 225 may include a measurement of the enclave 225 and/or source code of the enclave 225.

At 440, the service developer 210 may provide, to an application provider 230, the trusted application 220 for execution by the application provider 230. For example, the trusted application 220 having an enclave 225 is sent to the application provider 230 such that the enclave 225 performs $\mathcal{A}$ and the necessary steps of the data provisioning and the analysis phase as described herein. Consistent with implementations of the current subject matter, as described herein, the data processing may be implemented in response to mutual verification between the enclave 225 and the input party 202A. The mutual verification may be based on the trust data of the enclave 225 and the verification data of the input party 202A.

Figure 5:
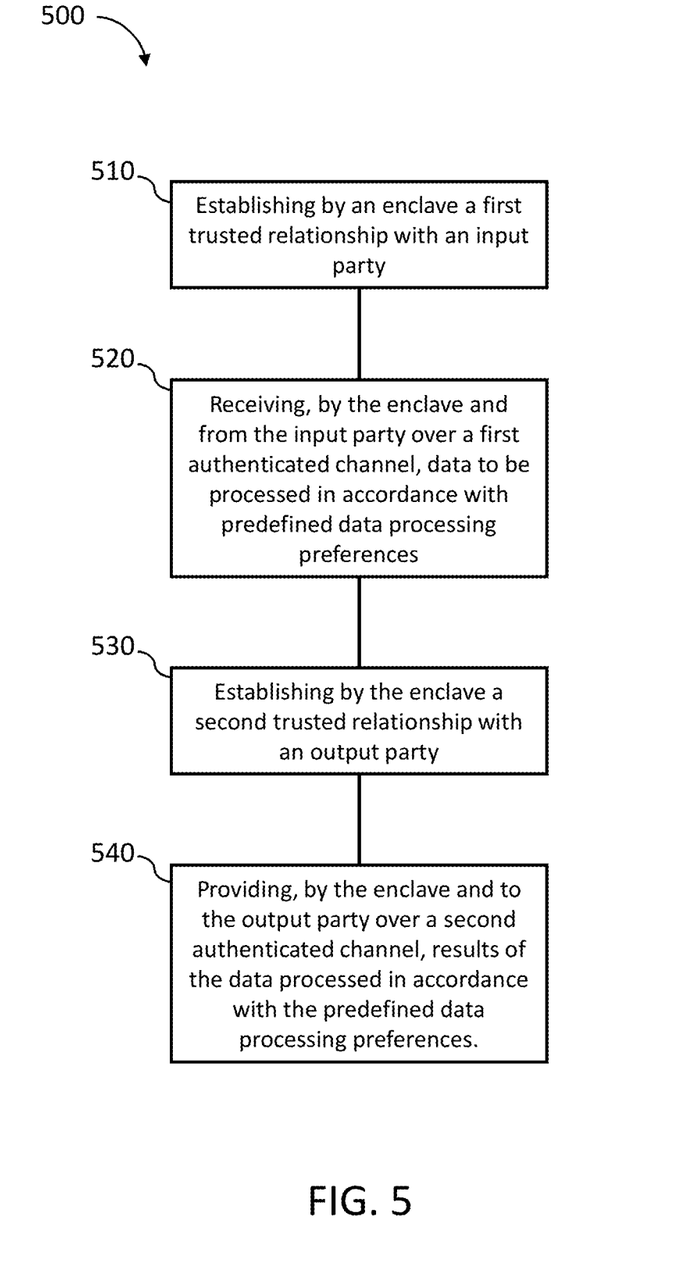
FIG. 5 depicts a flowchart illustrating a process consistent with implementations of the current subject matter.

FIG. 5 depicts a flowchart 500 illustrating a process consistent with implementations of the current subject matter.

At 510, the enclave 225 may establish a first trusted relationship with an input party 202A. According to aspects of the current subject matter, an untrusted application provider (e.g., the application provider 230 which may be a cloud provider) may support trusted execution environments. These trusted execution environments may run enclaves, which may be configured to perform data processing defined by at least one predefined data processing preference.

According to aspects of the current subject matter, the first trusted relationship may be based on exchanged trust data, for example, trust data associated with the enclave 225 and verification data associated with the input party 202A. Establishing the first trusted relationship may include the enclave 225 providing to the input party 202A trust data associated with the enclave 225 and authenticating the input party 202A as an authorized user. The trust data associated with the enclave 225 may include a measurement of the trusted execution environment 220 and/or source code of the enclave 225. According to some aspects, the enclave 225 may be a trusted entity based on matching the received trust data to data provided by a separate entity (e.g., the service developer 210) to the input party 202. The authentication of the input party 202 may include, for example, generating and sending to the input party 202A a random code; receiving, from the input party 202A, a message including a signed code and a verification key; and verifying that the signed code includes the random code, that the signed code is verifiable with the verification key, and/or that the verification key matches a setup verification key previously associated with the enclave 225.

According to aspects of the current subject matter, the predefined data processing preferences may include an analysis method and/or a data transfer policy. The analysis method may be an analysis $\mathcal{A}$ that the input party 202A wants to be performed by the enclave 225. For example, $\mathcal{A}$ may be one or multiple algorithms $\mathcal{R}_F$, which produce a differentially private version of function $\mathcal{R}$ on plaintext data. The data transfer policy may indicate transfer policies that define how the data should be transferred and handled.

At 520, the enclave 225 receives from the input party 202A, data to be processed in accordance with the at least one predefined data processing preference. The data is, according to aspects of the current subject matter, transmitted over a first authenticated channel. The enclave 225 may create the first authenticated channel to ensure safe transmission of data between the input party 202A and the enclave 225. In some implementations, the untrusted part of the trusted application 220 may be involved in the process of channel establishment. Consistent with implementations of the current subject matter, when the data is received by the enclave 225, the enclave 225 may tag the data with verification data associated with the input party 202A. The tagging of the data to associate or otherwise link the data to the input party 202A may be used to, for example, ensure that the tagged data is handled according to the predefined data processing preferences established by the input party 202A.

At 530, the enclave 225 may establish a second trusted relationship with an output party 302A. According to aspects of the current subject matter, the second trusted relationship may be based on exchanged trust data, for example, trust data associated with the enclave 225 and verification data associated with the output party 302A. Establishing the second trusted relationship may include the enclave 225 providing to the output party 302A trust data associated with the enclave 225 and authenticating the output party 302A as an authorized user. The trust data associated with the enclave 225 may include a measurement of the enclave 225 and/or source code of the enclave 225. The authentication of the output party 302A may include, for example, generating and sending to the output party 302A a random code; receiving, from the output party 302A, a message including a signed code and a verification key; and verifying that the signed code includes the random code, that the signed code is verifiable with the verification key, and/or that the verification key matches a setup verification key previously associated with the enclave 225.

At 540, the enclave 225 may provide to the output party 302A over a second authenticated channel, results of the data processed in accordance with the at least one predefined data processing preference. The enclave 225 may create the second authenticated channel to ensure safe transmission of data between the output party 302A and the enclave 225. The untrusted part of the trusted application 220 may be involved in the process of channel establishment. As described herein consistent with implementations of the current subject matter, the data processed in accordance with the predefined data processing preferences ensures that the analysis method and/or the data transfer policy as established by the input party 202A are followed. The analysis method may be an analysis $\mathcal{A}$ that the input party 202A wants to be performed by the enclave 225. For example, $\mathcal{A}$ may be one or multiple algorithms $\mathcal{R}_F$, which produce a differentially private version of function $\mathcal{R}$ on plaintext data. The data transfer policy may indicate transfer policies that define how the data should be transferred and handled. According to aspects of the current subject matter, the provision of the results of the data processed as provided to the output party 302A may be based on a function requested by the output party 302A. The function may be in accordance with the analysis method defined in the predefined data processing preferences.

According to aspects of the current subject matter, the first authenticated channel may be established by the enclave 225 during establishment of the first trusted relationship. The second authenticated channel may be established by the enclave 225 during establishment of the second trusted relationship. As described herein, the authenticated channels ensure that the data transmission is secure.

Consistent with implementations of the current subject matter and as described further herein, the disclosed enclave 225 incorporates high accuracy aspects of a central model in which each input party 202A-N sends its unprotected data to a trusted, central server and the central server runs the anonymization mechanism $\mathcal{R}_F$ on the clear data, while also incorporating high privacy aspects of a local model in which each input party 202A-N applies a differentially private mechanism $\mathcal{R}_F$ on its data and sends only anonymized results to a (e.g., untrusted) server for aggregation. Moreover, aspects of the current subject matter may result in high efficiency compared to general secure computation, while also having a flexibility to explicitly define and enforce input parties and output parties. Aspects of the current subject matter also provide for support for a variety of differentially private mechanisms or other anonymization techniques.

The enclave 225 according to aspects of the current subject matter may be implemented for the following example tasks. The enclave 225 may be implemented to calculate the average age of all users that were ever registered in a system (even users for which the party is no longer allowed to store the data in plaintext may be included in the calculation). The enclave 225 may be implemented for a taxi service to calculate the most frequent pickup points of all taxi rides, without generating traces of individuals. The anonymized result may be used to, for example, optimize waiting times and pickup points for taxis. The enclave 225 may be implemented for collaborative cross-company planning to benchmark or optimize processes, without revealing corporate secrets to competitors. The enclave 225 may be implemented to privately join different data sets to find common and/or similar customers and release anonymized customer statistics (e.g., for business planning joint ventures or cross-marketing campaigns) without revealing corporate secrets to competitors.

Figure 6:
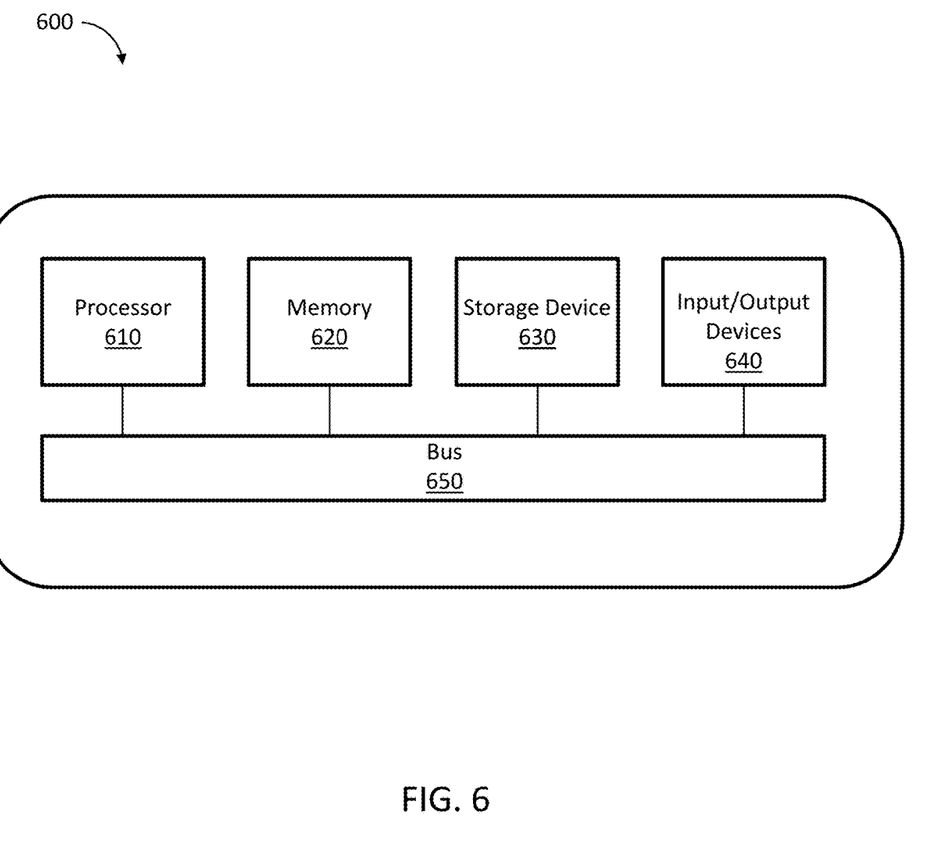
FIG. 6 depicts a block diagram illustrating a computing system consistent with implementations of the current subject matter.

FIG. 6 depicts a block diagram illustrating a computing system 600 consistent with implementations of the current subject matter. Referring to FIG. 1, FIG. 2, and FIG. 3, the computing system 600 can be used to implement the systems 100, 200, 300, and/or any components therein.

As shown in FIG. 6, the computing system 600 can include a processor 610, a memory 620, a storage device 630, and input/output devices 640. According to implementations of the current subject matter, a trusted execution environment may be a secure area that may be contained in the processor 610, or it may be an additional hardware and/or software component. The trusted execution environment may run enclaves to guarantee confidentiality and integrity protection to code and data contained therein, even in an untrusted environment.

The processor 610, the memory 620, the storage device 630, and the input/output devices 640 can be interconnected via a system bus 650. The processor 610 is capable of processing instructions for execution within the computing system 600. Such executed instructions can implement one or more components of, for example, the systems 100, 200, and/or 300. In some implementations of the current subject matter, the processor 610 can be a single-threaded processor. Alternately, the processor 610 can be a multi-threaded processor. The processor 610 is capable of processing instructions stored in the memory 620 and/or on the storage device 630 to display graphical information for a user interface provided via the input/output device 640.

The memory 620 is a computer readable medium such as volatile or non-volatile that stores information within the computing system 600. The memory 620 can store data structures representing configuration object databases, for example. The storage device 630 is capable of providing persistent storage for the computing system 600. The storage device 630 can be a floppy disk device, a hard disk device, an optical disk device, or a tape device, or other suitable persistent storage means. The input/output device 640 provides input/output operations for the computing system 600. In some implementations of the current subject matter, the input/output device 640 includes a keyboard and/or pointing device. In various implementations, the input/output device 640 includes a display unit for displaying graphical user interfaces.

According to some implementations of the current subject matter, the input/output device 640 can provide input/output operations for a network device. For example, the input/output device 640 can include Ethernet ports or other networking ports to communicate with one or more wired and/or wireless networks (e.g., a local area network (LAN), a wide area network (WAN), the Internet).

In some implementations of the current subject matter, the computing system 600 can be used to execute various interactive computer software applications that can be used for organization, analysis and/or storage of data in various (e.g., tabular) format (e.g., Microsoft Excel®, and/or any other type of software). Alternatively, the computing system 600 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be standalone computing products and/or functionalities. Upon activation within the applications, the functionalities can be used to generate the user interface provided via the input/output device 640. The user interface can be generated and presented to a user by the computing system 600 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one data processor; and
   at least one memory storing instructions which, when executed by the at least one data processor, result in operations comprising:
   establishing, by an enclave that is part of a trusted application running at an application provider and that is configured to perform data processing defined by at least one predefined data processing preference, a first trusted relationship with an input device, wherein the establishment is based on trust data associated with the enclave and verification data associated with the input device;

receiving, by the enclave and from the input device over a first authenticated channel, data to be processed in accordance with the at least one predefined data processing preference;

establishing, by the enclave, a second trusted relationship with an output device, wherein the establishment is based on the trust data associated with the enclave and verification data associated with the output device, wherein establishing the second trusted relationship with the output device further comprises providing, by the enclave and to the output device, trust data associated with the enclave and authenticating, by the enclave, the output device as an authorized user of the enclave; and providing, by the enclave and to the output device over a second authenticated channel, results of the data processed in accordance with the at least one predefined data processing preference.

2. The system of claim 1, wherein establishing the first trusted relationship with the input device comprises:
providing, by the enclave and to the input device, trust data associated with the enclave; and
authenticating, by the enclave, the input device as an authorized user of the enclave.

3. The system of claim 2, wherein the trust data associated with the enclave comprises one or more of a measurement of the enclave and source code of the enclave, and further wherein the enclave is a trusted entity based on the trust data matching setup trust data previously provided by a separate entity to the input device.

4. The system of claim 2, wherein the authentication of the input device comprises:
generating and sending to the input device a random code;
receiving, from the input device, a message comprising a signed code and a verification key; and
verifying one or more of the signed code comprising the random code, the signed code verifiable with the verification key, and the verification key matching a setup verification key previously associated with the enclave.

5. The system of claim 1, wherein the at least one predefined data processing preference comprises an analysis method and/or a data transfer policy.

6. The system of claim 5, wherein the at least one memory storing instructions, when executed by the at least one data processor, result in further operations comprising:
tagging the data with verification data associated with the input device; and
handling the tagged data in according with the data transfer policy and based on the verification data associated with the input device.

7. The system of claim 5, wherein the providing of the results of the data processed to the output device is based on a function requested by the output device, the function in accordance with the analysis method defined in the at least one predefined data processing preference.

8. The system of claim 1, wherein the trust data associated with the enclave comprises one or more of a measurement of the enclave and source code of the enclave, and further wherein the enclave is a trusted entity based on the trust data matching setup trust data previously provided by a separate entity to the output device.

9. The system of claim 1, wherein the authentication of the output device comprises:
generating and sending to the output device a random code;
receiving, from the output device, a message comprising a signed code and a verification key; and
verifying one or more of the signed code comprising the random code, the signed code verifiable with the verification key, and the verification key matching a setup verification key previously associated with the enclave.

10. The system of claim 1, wherein the first authenticated channel is established by the enclave during establishment of the first trusted relationship and/or wherein the second authenticated channel is established by the enclave during establishment of the second trusted relationship.

11. A computer-implemented method, comprising:
establishing, by an enclave that is part of a trusted application running at an application provider and that is configured to perform data processing defined by at least one predefined data processing preference, a first trusted relationship with an input device, wherein the establishment is based on trust data associated with the enclave and verification data associated with the input device;
receiving, by the enclave and from the input device over a first authenticated channel, data to be processed in accordance with the at least one predefined data processing preference;
establishing, by the enclave, a second trusted relationship with an output device, wherein the establishment is based on the trust data associated with the enclave and verification data associated with the output device, wherein establishing the second trusted relationship with the output device further comprises providing, by the enclave and to the output device, trust data associated with the enclave and authenticating, by the enclave, the output device as an authorized user of the enclave; and
providing, by the enclave and to the output device over a second authenticated channel, results of the data processed in accordance with the at least one predefined data processing preference.

12. The method of claim 11, wherein establishing the first trusted relationship with the input device comprises:
providing, by the enclave and to the input device, trust data associated with the enclave; and
authenticating, by the enclave, the input device as an authorized user of the enclave.

13. The method of claim 12, wherein the trust data associated with the enclave comprises one or more of a measurement of the enclave and source code of the enclave, and further wherein the enclave is a trusted entity based on the trust data matching setup trust data previously provided by a separate entity to the input device.

14. The method of claim 12, wherein the authentication of the input device comprises:
generating and sending to the input device a random code;
receiving, from the input device, a message comprising a signed code and a verification key; and
verifying one or more of the signed code comprising the random code, the signed code verifiable with the verification key, and the verification key matching a setup verification key previously associated with the enclave.

15. The method of claim 11, wherein the at least one predefined data processing preference comprises an analysis method and/or a data transfer policy.

16. The method of claim 15, further comprising:
tagging the data with verification data associated with the input device; and
handling the tagged data in according with the data transfer policy and based on the verification data associated with the input device.

17. The method of claim 15, wherein the providing of the results of the data processed to the output device is based on a function requested by the output device, the function in accordance with the analysis method defined in the at least one predefined data processing preference.

18. The method of claim 11 wherein the trust data associated with the enclave comprises one or more of a measurement of the enclave and source code of the enclave, and further wherein the enclave is a trusted entity based on the trust data matching setup trust data previously provided by a separate entity to the output device.

19. The method of claim 11, wherein the authentication of the output device comprises:
generating and sending to the output device a random code;
receiving, from the output device, a message comprising a signed code and a verification key; and
verifying one or more of the signed code comprising the random code, the signed code verifiable with the verification key, and the verification key matching a setup verification key previously associated with the enclave.

20. The method of claim 11, wherein the first authenticated channel is established by the enclave during establishment of the first trusted relationship and/or wherein the second authenticated channel is established by the enclave during establishment of the second trusted relationship.

21. A non-transitory computer-readable storage medium including instructions which, when executed by the at least one data processor, result in operations comprising:
establishing, by an enclave that is part of a trusted application running at an application provider and that is configured to perform data processing defined by at least one predefined data processing preference, a first trusted relationship with an input device, wherein the establishment is based on trust data associated with the enclave and verification data associated with the input device;
receiving, by the enclave and from the input device over a first authenticated channel, data to be processed in accordance with the at least one predefined data processing preference;
establishing, by the enclave, a second trusted relationship with an output device, wherein the establishment is based on the trust data associated with the enclave and verification data associated with the output device, wherein establishing the second trusted relationship with the output device further comprises providing, by the enclave and to the output device, trust data associated with the enclave and authenticating, by the enclave, the output device as an authorized user of the enclave; and
providing, by the enclave and to the output device over a second authenticated channel, results of the data processed in accordance with the at least one predefined data processing preference.

\* \* \* \* \*